US012069028B2

(12) United States Patent
Cai

(10) Patent No.: US 12,069,028 B2
(45) Date of Patent: Aug. 20, 2024

(54) FAST POLICY MATCHING WITH RUNTIME SIGNATURE UPDATE

(71) Applicant: Palo Alto Networks, Inc., Santa Clara, CA (US)

(72) Inventor: Chunqing Cai, Los Altos, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 253 days.

(21) Appl. No.: 17/842,324

(22) Filed: Jun. 16, 2022

(65) Prior Publication Data

US 2023/0412564 A1    Dec. 21, 2023

(51) Int. Cl.
*H04L 9/40*    (2022.01)

(52) U.S. Cl.
CPC ...... *H04L 63/0245* (2013.01); *H04L 63/1416* (2013.01); *H04L 63/20* (2013.01)

(58) Field of Classification Search
None
See application file for complete search history.

(56) References Cited

U.S. PATENT DOCUMENTS

2017/0300689 A1*  10/2017  Phanse ................. H04W 12/08
2022/0116411 A1*   4/2022  Melicher ............. H04L 63/0263

OTHER PUBLICATIONS

Mat Phillips, TLSFilter: An Application-Level Firewall for Transport Layer Security, Final Report, Jun. 16, 2014.
Mir Ahsan, Ryerson University, Digital Commons @ Ryerson, Thesis and Dissertations, Jan. 1, 2013.
Schneider et al., A Language-Based Approach to Security, Lecture Notes in Computer Science book series (LNCS, vol. 2000).

* cited by examiner

*Primary Examiner* — Cai Y Chen
(74) *Attorney, Agent, or Firm* — Van Pelt, Yi & James LLP

(57) ABSTRACT

Techniques for fast policy matching with runtime signature update are disclosed. In some embodiments, a system/process/computer program product for fast policy matching with runtime signature update includes receiving a plurality of rules for malware signatures; compiling the plurality of rules for a fast policy matching engine that detects malware using the malware signatures; and executing the compiled plurality of rules using the fast policy matching engine to detect malware using at least one of the malware signatures.

20 Claims, 12 Drawing Sheets

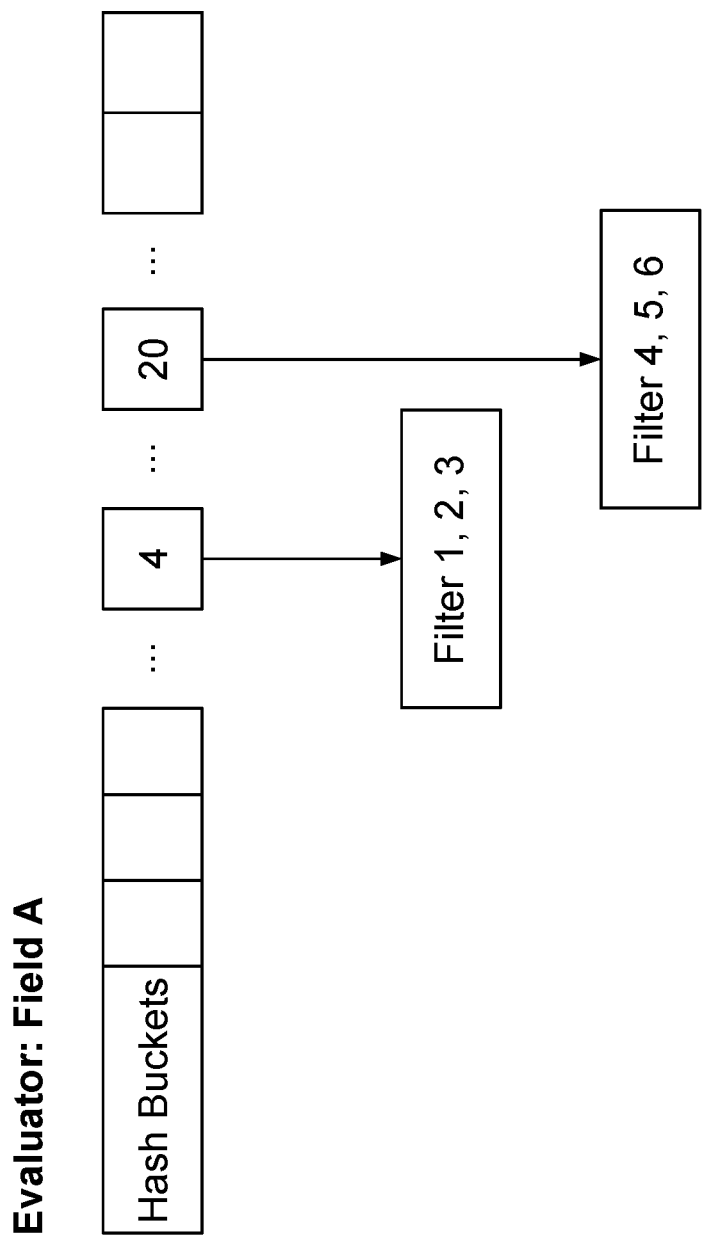

FAST POLICY MATCHING WITH RUNTIME SIGNATURE UPDATE

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 4A is a diagram that illustrates how a positive hash evaluator of field A is constructed in accordance with some embodiments.

DETAILED DESCRIPTION

Figure 1:
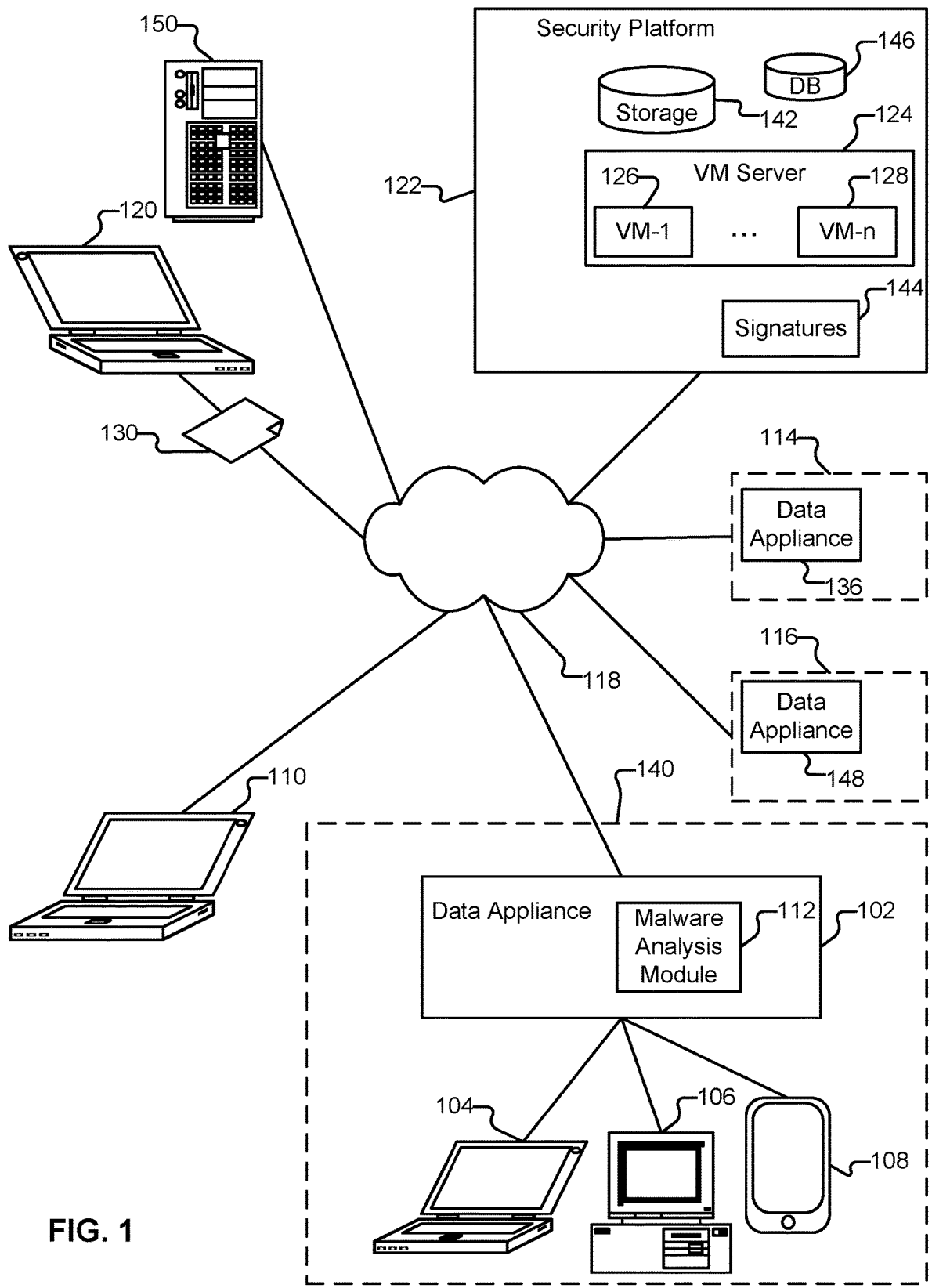
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)) as well as CN Series container next generation firewalls. For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Overview of Techniques for Fast Policy Matching with Runtime Signature Update

In the world of networking security, there are requirements that a large number of rules (e.g., security rules, such as firewall rules, for signature matching to detect malware using the predetermined signatures) need to be matched against very significant amounts of incoming data (e.g., of monitored network data). This is generally now a requirement in nearly all network devices that are executing routing protocols, security rules, and/or content inspection algorithms.

With the increasingly complex situations the devices have to support, it is not uncommon to have several thousands of rules configured and have to be matched at runtime (e.g., execution time). For example, for distributed denial of service (DDOS) detection applications, with the ever increasing DDOS types of attacks each day, the number of rules to detect DDOS attacks will only become greater.

However, matching rules against data sequentially, field by field, is expensive, and will cause performance degradation. Unfortunately, existing hardware generally cannot be of help in many of these cases, as such hardware is lacking in flexibility for such complex rule matching operations.

Another requirement is the need to support new signature formats within the same, for example, software release, so that the day-to-day issues can be resolved promptly. As such, this generally requires the parsing engine not to be hard-coded.

Thus, what are needed are improved security solutions that can more efficiently process different formats and increasing numbers of rules for efficient and enhanced signature matching for malware detection.

Accordingly, new and improved techniques for fast policy matching with runtime signature update are disclosed.

In some embodiments, a system/process/computer program product for fast policy matching with runtime signature update includes receiving a plurality of rules for malware signatures; compiling the plurality of rules for a fast policy matching engine that detects malware using the malware signatures; and executing the compiled plurality of rules using the fast policy matching engine (e.g., for a layer 3 and layer 4 threat engine of a firewall) to detect malware using at least one of the malware signatures. For example, the fast policy matching engine can include a hash bucket evaluator for match, not match, and range as will be further described below with respect to various embodiments.

In some embodiments, a system/process/computer program product for fast policy matching with runtime signature update further includes parsing each of the user defined rules to extract distinct fields; and generating an evaluator for each of the extracted distinct fields.

In some embodiments, a system/process/computer program product for fast policy matching with runtime signature update further includes parsing each of the user defined rules to extract distinct fields; generating an evaluator for each of the extracted distinct fields; and performing runtime processing of incoming network packets using the to detect malware.

For example, the disclosed fast policy matching can be performed by pre-calculating configured rules and regrouping them into matching fields, and using hash buckets and binary search to shorten the matching cycles. As such, the performance degradation is determined by the complexity of the data format rather than the total number of rules configured (e.g., the latter is usually several orders of magnitude larger than the former).

In this example, the user configured rules can be split into a list of evaluators, by combining the same type of evaluations on the same fields together. There are three types of evaluators: a positive hash evaluator, a negative hash evaluator, and a range evaluator. Both positive and negative hash evaluators can use a hash algorithm to match the incoming values. The range evaluator can use a binary search algorithm(s) to accelerate the search (e.g., a filter range can be sorted for binary search resulting in a log(n) complexity, such as further described herein).

Further, the incoming data can be evaluated against all evaluators that have a potential match. If an evaluator matches one of the fields, then the original filter containing this field will have a hit count incremented. At the end of the evaluation, all filters having at least one hit count will be checked, and the first filter whose field count equals to the hit count will be returned as the matching filter.

As such, given that the number of fields that need to be supported for all formats is limited (e.g., IP has approximately 13 fields and TCP has approximately 10 fields), by aggregating the same field together, it can reduce a significant number of redundant evaluations during runtime. In other words, the total number of evaluators will not increase proportionally with the total number of configured filters. Also, by utilizing a hash look up and a binary search, the performance can also be enhanced.

In an example implementation, it is possible to achieve improved performance even when large volumes of incoming data have to be examined by thousands of user configured filters. Given that the total amount of Internet traffic keeps increasing dramatically each year, and the complexity of data also generally keeps increasing, the disclosed techniques for fast policy matching with runtime signature update will have a growing number of applications to facilitate improved performance for such pattern matching based on rules in various formats.

Accordingly, new and improved security solutions that facilitate fast policy matching with runtime signature update using a security platform (e.g., a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) are disclosed in accordance with some embodiments.

These and other embodiments and examples for fast policy matching with runtime signature update will be further described below.

Example System Architectures for Fast Policy Matching with Runtime Signature Update Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of, for example, applying the disclosed techniques for fast policy matching with runtime signature update as further described below.

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110, can be protected from such malware.

"Malware" as used herein generally refers to an application that engages in behaviors, whether clandestinely or not (and whether illegal or not), of which a user does not approve/would not approve if fully informed. Examples of malware include ransomware, Trojans, viruses, rootkits, spyware, hacking tools, etc. One example of malware is a desktop/mobile application that encrypts a user's stored data (e.g., ransomware). Another example of malware is a desktop/mobile application that collects and reports to a remote server the end user's activities and/or various information associated with the user (e.g., spyware).

"Signature" or "malware signature" as used herein generally refers to a pattern associated with a malicious attack or threat on a computer network or system (e.g., unauthorized software execution, unauthorized network access, unauthorized directory access, unauthorized network traffic activities, and/or anomalies in the use of network privileges on a computing and/or network capable device). For example, this pattern can be a series of bytes in a file (e.g., a byte sequence) or in network traffic (e.g., a sequence of packets).

Techniques described herein can be used in conjunction with a variety of platforms (e.g., servers, computing appliances, virtual/container environments, desktops, mobile devices, gaming platforms, embedded systems, etc.) and/or for automated detection of a variety of forms of malware and/or threats as similarly described above. In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
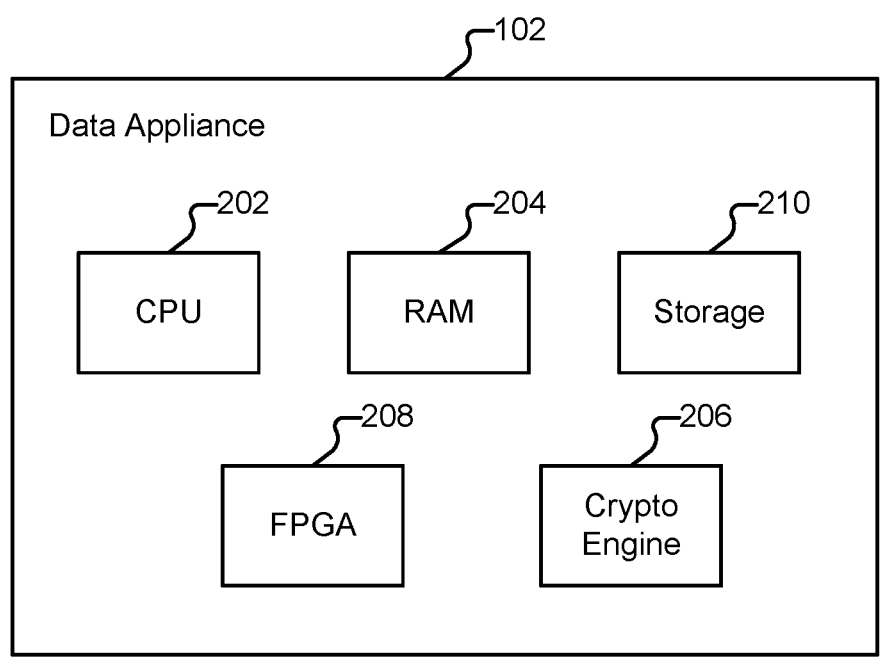
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning (ML) models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
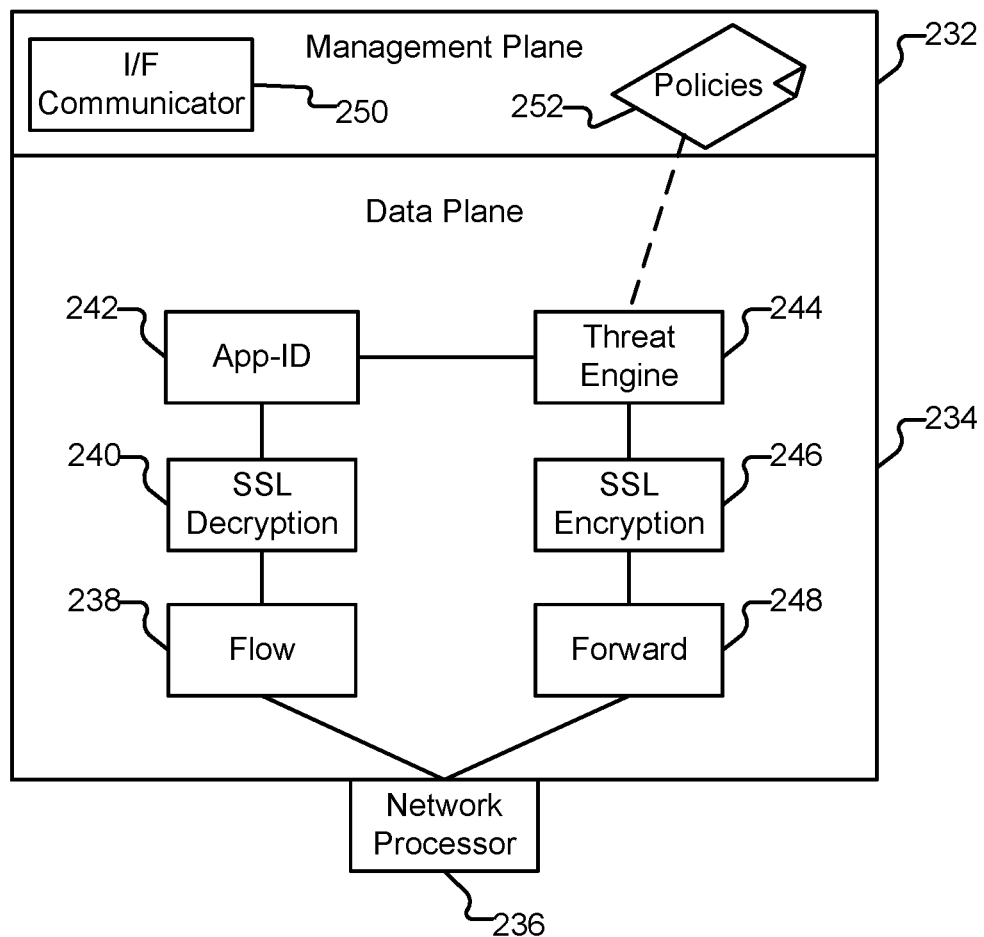
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control distinct options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Distinct types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. Example policies can include malware detection policies that can include user defined rules using the disclosed techniques for fast policy matching with runtime signature update. An interface (I/F) communicator 250 is provided for management communications (e.g., via (REST) APIs, messages, or network protocol communications or other communication mechanisms).

Security Platform

Returning to FIG. 1, suppose a malicious individual (using system 120) has created malware 130 (e.g., the malware can be delivered to endpoint devices of users via a compromised web site when the user visits/browses to the compromised web site or via a phishing attack, etc.). The malicious individual hopes that a client device, such as client device 104, will execute a copy of malware 130 to unpack the malware executable/payload, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. In this example, Alice receives the email and clicks on the link to a phishing/compromised site that could result in an attempted download of malware 130 by Alice's client device 104. However, in this example, data appliance 102 can perform the disclosed techniques for fast policy matching with runtime signature update and block access from Alice's client device 104 to the packed malware content and to thereby preempt and prevent any such download of malware 130 to Alice's client device 104. As will be further described below, data appliance 102 performs the disclosed techniques for fast policy matching with runtime signature update, such as further described below, to detect and block such malware 130 from harming Alice's client device 104.

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD hash of malware 130), data appliance 102 can prevent the transmission of malware 130 to client device 104 accordingly (e.g., by detecting that an MD5 hash of the email attachment sent to client device 104 matches the MD hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140).

As will be described in more detail below, security platform 122 can also receive a copy of malware 130 from data appliance 102 to perform cloud-based security analysis for performing fast policy matching with runtime signature update, and the malware verdict can be sent back to data appliance 102 for enforcing the security policy to thereby safeguard Alice's client device 104 from execution of malware 130 (e.g., to block malware 130 from access on client device 104).

Further, security platform 122 can also provide other types of information to data appliance 102 (e.g., as part of a subscription) such as a set of information for performing the disclosed techniques for fast policy matching with runtime signature update usable by data appliance 102 to perform inline analysis of such malware files as will be further described below.

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm. As a third example, data appliance 102 can be configured to provide the file (e.g., malware 130) to security platform 122 for static/dynamic analysis, to determine whether it is malicious and/or to otherwise classify it.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124).

In various embodiments, security platform 122 makes available results of its analysis of samples via a list of signatures (and/or other identifiers) to data appliance 102 as part of a subscription. For example, security platform 122 can periodically send a content package (e.g., including signatures 144) that identifies malware files, including for fast policy matching with runtime signature update (e.g., daily, hourly, or some other interval, and/or based on an event configured by one or more policies). An example content package includes signatures and/or other information (e.g., malware/threat detection models), such as further described below. The subscription can cover the analysis of just those files intercepted by data appliance 102 and sent to security platform 122 by data appliance 102, and can also cover signatures of malware known to security platform 122.

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

Analyzing Samples Using Static/Dynamic Analysis

Figure 3:
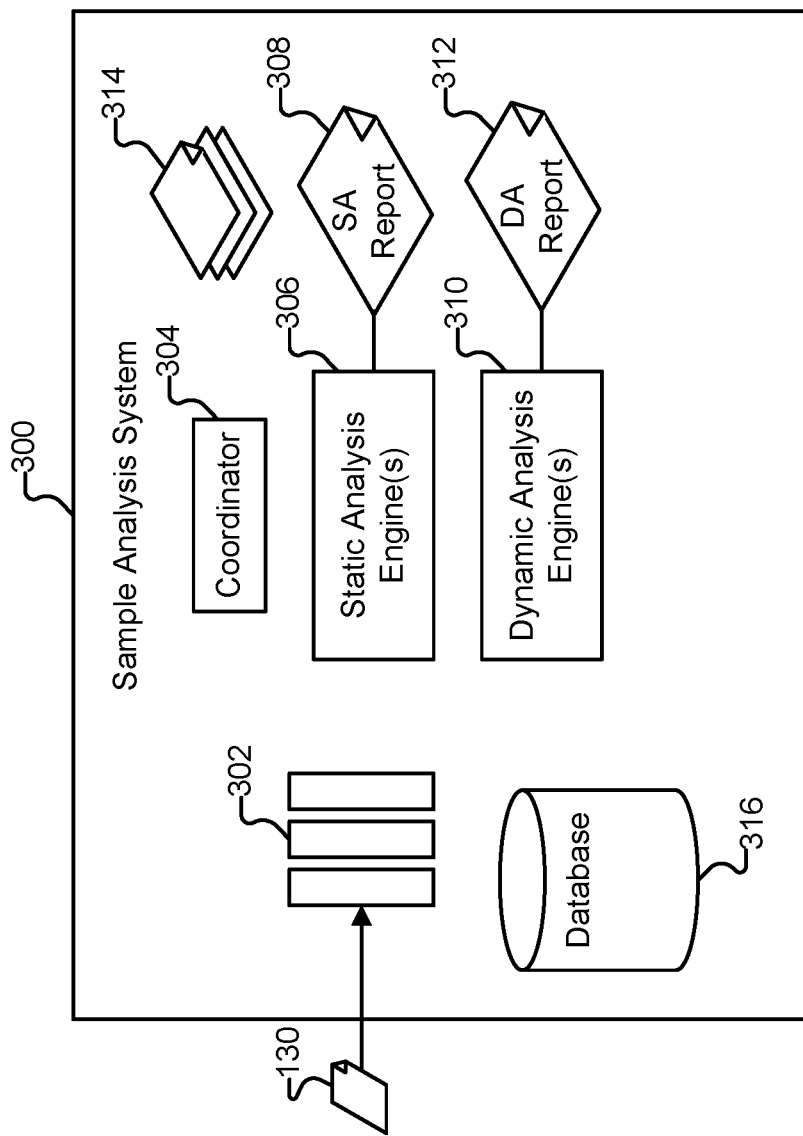
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., OS exploit files); signatures, hashes, and/or other identifiers of known safe libraries; and signatures, hashes, and/or other identifiers of known malicious libraries.

In various embodiments, when a new sample is received for analysis (e.g., an existing signature associated with the sample is not present in analysis system 300), it is added to queue 302. As shown in FIG. 3, application 130 is received by system 300 and added to queue 302.

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. As an example, static analysis of malware can include performing a signature-based analysis. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static report information can be used to help select/customize the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

Fast Policy Matching with Runtime Signature Update

Various embodiments for performing fast policy matching with runtime signature update will now be disclosed.

Content Definition

To achieve custom signature delivery through content update, every field of the format is provided a global definition, such as will now be described with respect to the below example definitions. In this example, each field has two types of references: a string name and a global unique ID.

In Table 1, examples of the definitions of certain fields in TCP format are provided as shown below.

TABLE 1

| Format Name | Field Name | Global ID |
|---|---|---|
| "tcp" | "src-port" | 1234 |
| "tcp" | "dst-port" | 1235 |
| "tcp" | "seq" | 1236 |

Signature Definition

With the above-described example standard format definitions, signatures can be predefined and delivered through content updates. In this embodiment, a signature definition includes a list of fields with evaluation type (e.g., exact match, masked match, range compare, etc.), the values to be evaluated against, along with the names of the format definition and format fields. For example, the following signature examines the TCP source port and destination port fields with distinct types of evaluations as shown in the below example signature.

```
<signature id="123456">
    <evaluation type="exact">
        <content>tcp</content>
        <field>src-port</field>
        <value>80</value>
    </evaluation>
    <evaluation type="range">
        <content>tcp</content>
        <field>dst-port</field>
        <low>10</low>
        <high>20</high>
    </evaluation>
</signature>
```

For the above signature, the filter requires matching TCP source port field with the exact value of 80, and destination port with a range of values from 10 to 20.

After the above-described signature is available, a user can configure the same filter in two separate ways. For example, for the above filter, the user can either configure the matching rule directly or configure using the filter as illustrated below.

add rule match tcp src-port eq 80 and tcp dst-port range 10 20 add rule match signature id 123456

Both can achieve the same result, but the latter is generally simpler and easier to use.

Runtime Protection via Content Update

Runtime protection can be achieved by allowing the user to add a rule matching signature list, which includes a list of signatures whose content can be dynamically updated as shown below.

```
<signature-list name="list1">
    <signature id="123456"/>
    <signature id="123457"/>
    ......
<signature-list>
add rule match signature-list name list1
```

Internally, the above configuration will be translated to multiple filters as shown below.

add rule match signature id 123456 add rule match signature id 123457

Each filter will in turn be translated into native command matching fields against values.

The device (e.g., security device, such as a firewall or another security device) maintains connection to the content server in order to retrieve dynamic updates (e.g., cloud security service that periodically provides content updates, such as a security content subscription as similarly described above). Whenever there is a new definition published, contents of the signature list will be updated accordingly, which will trigger the device to update its filters, after which the incoming data will be examined with new definitions without the need of a software update (e.g., binary code software update).

Policy Preprocessing

In an example implementation, in order to avoid sequential evaluation of thousands of filters at runtime, the filters can be preprocessed. Specifically, the same type of evaluations of the same fields can be aggregated into evaluators, which include either a list of hash buckets or a sorted range list. In this example implementation, there are generally three types of evaluations: (1) exact match with mask, (2) exact negative match with mask, and (3) range comparison. The evaluators can also use either hash or binary search algorithms to improve data processing efficiency and reduce processing time to thereby reduce compute resources utilization.

Types of Evaluators

As described above, three types of evaluators include the following: (1) a positive hash evaluator, (2) a negative hash evaluator, and (3) a range evaluator.

The positive hash evaluator includes a hash table, with hash entries containing values to be examined. Each value maintains a list of dispatch indices, referring to the original filters containing this field.

An example is illustrated below.
Filter 1: match field A==4 and . . .
Filter 2: match field A==4 and . . .
Filter 3: match field A==4 and . . .
Filter 4: match field A==20 and . . .
Filter 5: match field A==20 and . . .
Filter 6: match field A==20 and . . .

FIG. 4A is a diagram that illustrates how a positive hash evaluator of field A is constructed in accordance with some embodiments.

The negative hash evaluator includes a hash table, with hash entries containing values to be examined. There are two levels of dispatch index lists. The first level contains an exclude list. The second level contains an all-inclusive list. If the value hits a bucket containing no values, the all-inclusive dispatch list will be used to dispatch the result to filters. On the other hand, if the bucket does contain a configured value, the members contained in the exclude list will be subtracted from the all-inclusive list before dispatching the result to filters.

An example is illustrated below.
Filter 1: match field A !=4 and . . .
Filter 2: match field A !=4 and . . .
Filter 3: match field A !=4 and . . .
Filter 4: match field A !=20 and . . .
Filter 5: match field A !=20 and . . .
Filter 6: match field A !=20 and . . .

Figure 4B:
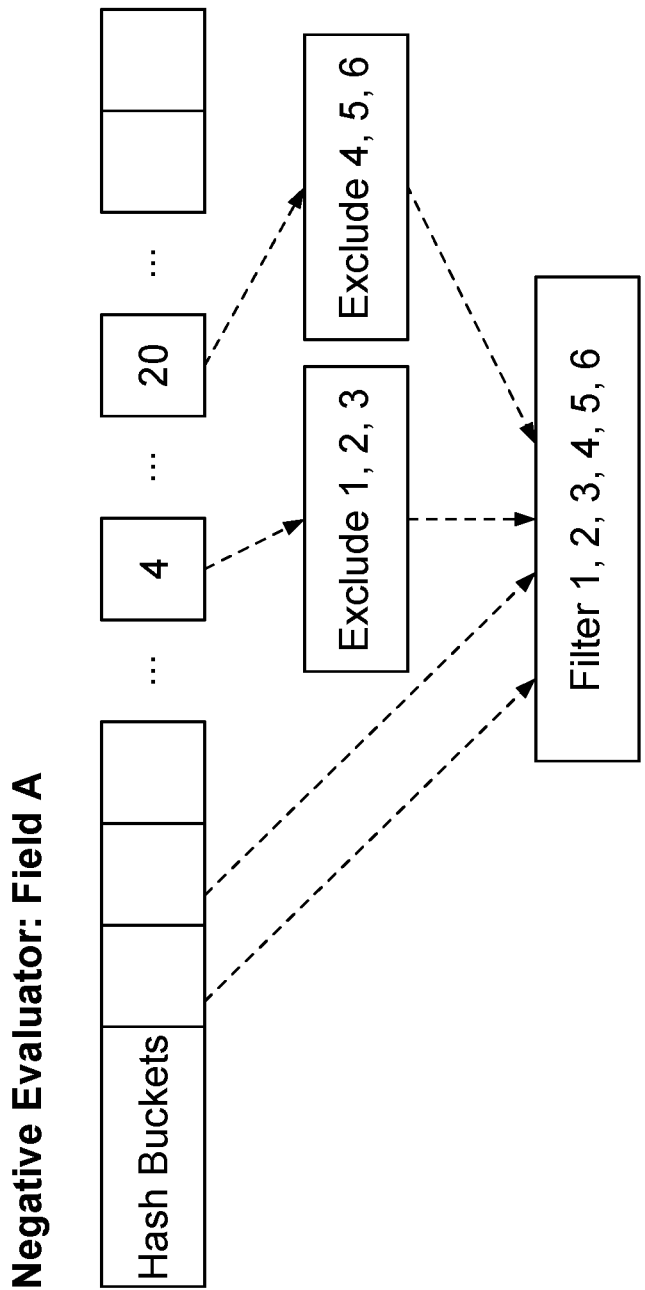
FIG. 4B is a diagram that illustrates how a negative hash evaluator of field A is constructed in accordance with some embodiments.

FIG. 4B is a diagram that illustrates how a negative hash evaluator of field A is constructed in accordance with some embodiments.

The range evaluator includes a list of non-overlapping ranges, sorted in ascending order. Each range is associated with a dispatch list. A value can be searched against all ranges through binary search. If there is a hit, the dispatch list will be used to notify the original filter.

An example is illustrated below.
Filter 1: match field A>10 and A<30 and . . .
Filter 2: match field A>20 and A<40 and . . .
Filter 3: match field A>30 and A<50 and . . .

Figure 4C:
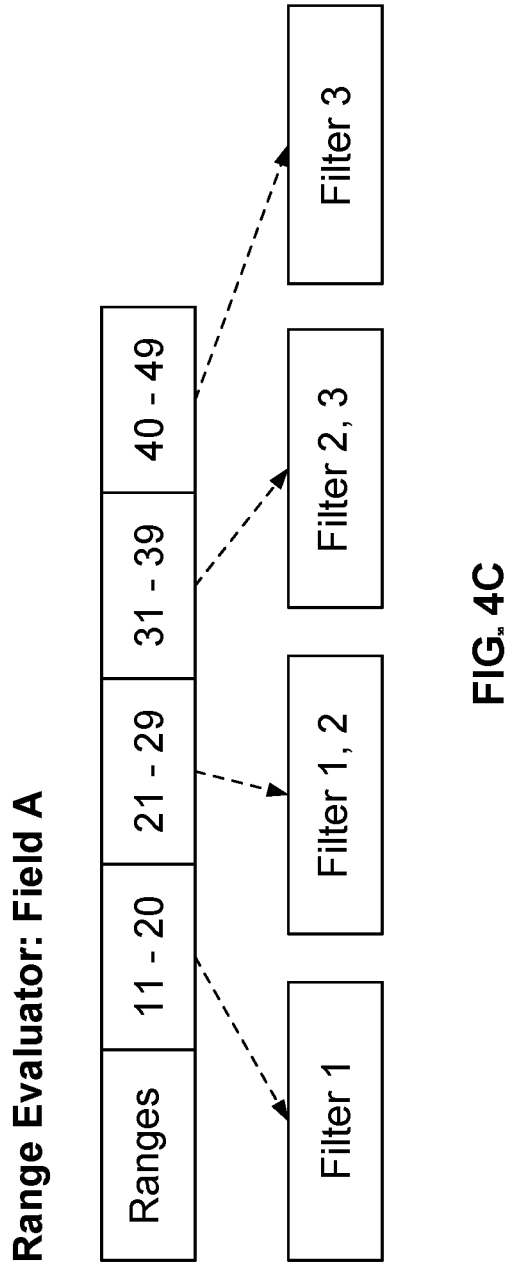
FIG. 4C is a diagram that illustrates how a range evaluator of field A is constructed in accordance with some embodiments.

FIG. 4C is a diagram that illustrates how a range evaluator of field A is constructed in accordance with some embodiments.

Data Processing Overview

When incoming data is present, all relevant evaluators will be evaluated.

For each evaluator, first a single value is extracted from the incoming data based on the definition ID associated with the evaluator. Next, the value is evaluated against hash values or range values stored in the evaluator. If there is a hit, the corresponding filter will get a hit count.

Because fields are shared among different filters, it is possible that a hit of one field results in an update of the hit count for multiple filters.

After all the evaluators are processed, the hit counts are examined for all filters having at least one hit count. If a filter's hit count is equal to the number of its fields, the filter is considered to match the incoming data. In case there are multiple potential hits, the first filter will be returned.

Figure 4D:
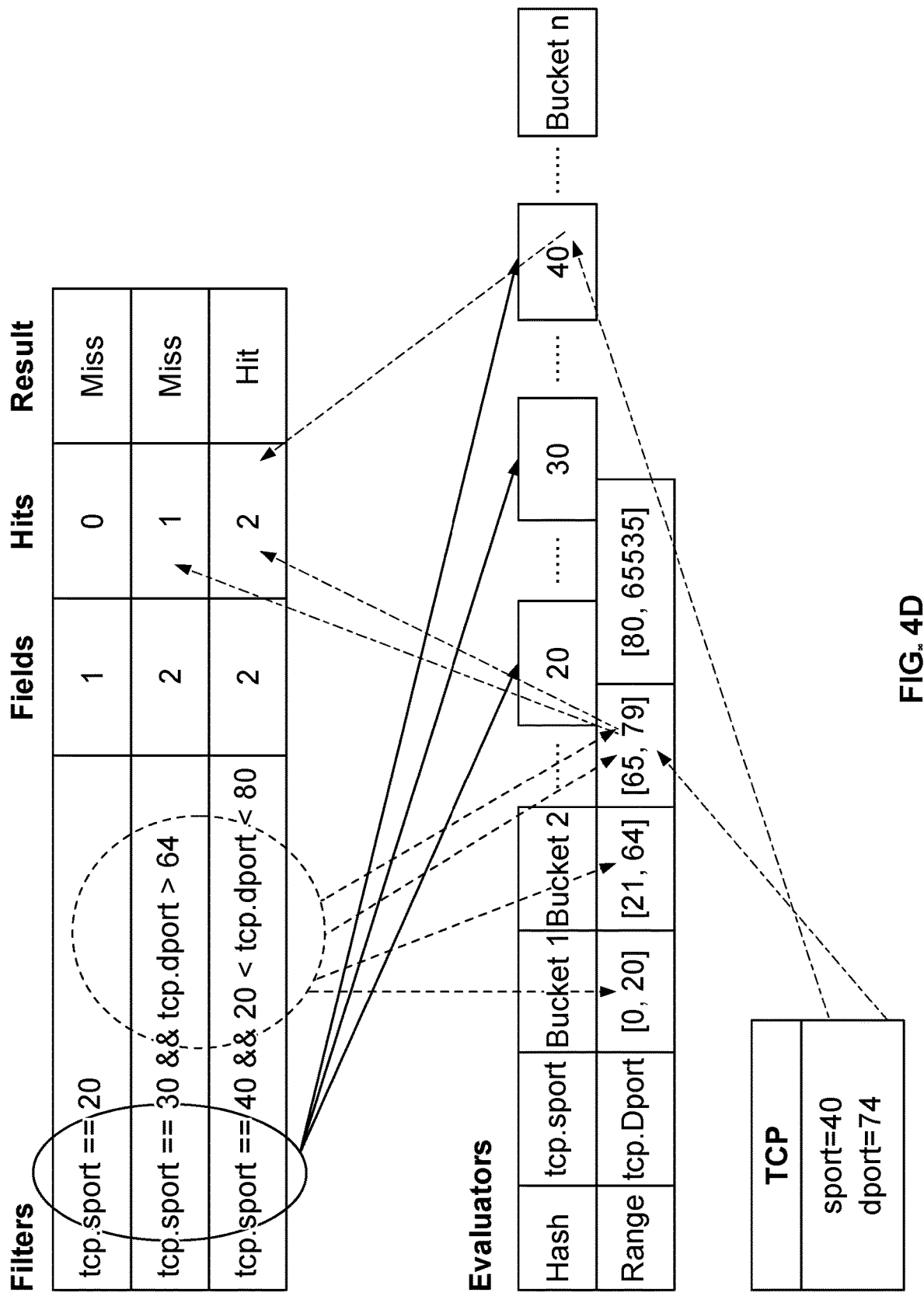
FIG. 4D illustrates an example of three filters matching two fields in accordance with some embodiments.

FIG. 4D illustrates an example of three filters matching two fields in accordance with some embodiments. As shown in this example, the three filters match two fields (i.e., tcp source port (sport) and tcp destination port (dport)).

OR Operation

The above-described example implementation generally requires that the logical operations of all fields within a filter be "and" operations. The "or" operation can be supported among different filters by allowing them to take the same action.

Figure 4E:
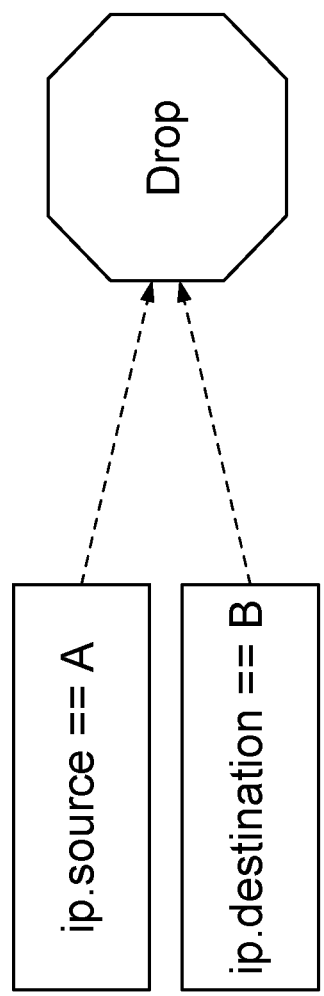
FIG. 4E is a diagram that illustrates an OR operation in accordance with some embodiments.

FIG. 4E is a diagram that illustrates an OR operation in accordance with some embodiments.

In this example, assume that packets need to be dropped by the rule shown below.
(source IP==A) or (destination IP==B)
To achieve the above configuration, two filters can be implemented as shown below.
Filter 1: match ip.source_addr eq A
Filter 2: match ip.destination_addr eq B
Then combine these two filters to take the same action as illustrated in FIG. 4D.

Optimization

To optimize for performance, the evaluators could be evaluated only if there might be a potential hit for incoming data. For example, if the incoming packet is UDP, then all evaluators related to TCP fields can be skipped. In the last step of checking out which filter has a hit, the filters that have a 0 hit count could also be skipped. This is beneficial for detecting abnormal data patterns, which typically would only happen rarely, because most of the time the evaluator will result in 0 hits, in which case the final step can be skipped completely.

Hardware Implementation

The disclosed techniques for fast policy matching with runtime signature update can be implemented by software as well as hardware (e.g., implemented in an ASIC, FPGA, etc.).

For an example of a hardware implementation, standard evaluators that support hash or range lookup can be implemented as processing pools. Translation of filters into evaluators can still be performed in software as similarly described above. Software programs the evaluators with types of operations, matching values with global IDs, and a list of dispatching indices. Software also can be used to program an expected hit count for each filter into the hardware. At runtime, the software can automatically parse the incoming data, write available values along with predefined global IDs into hardware, and trigger the hardware to run the evaluators. As a result, the hardware then returns a matching filter index to the software for further processing.

Figure 5:
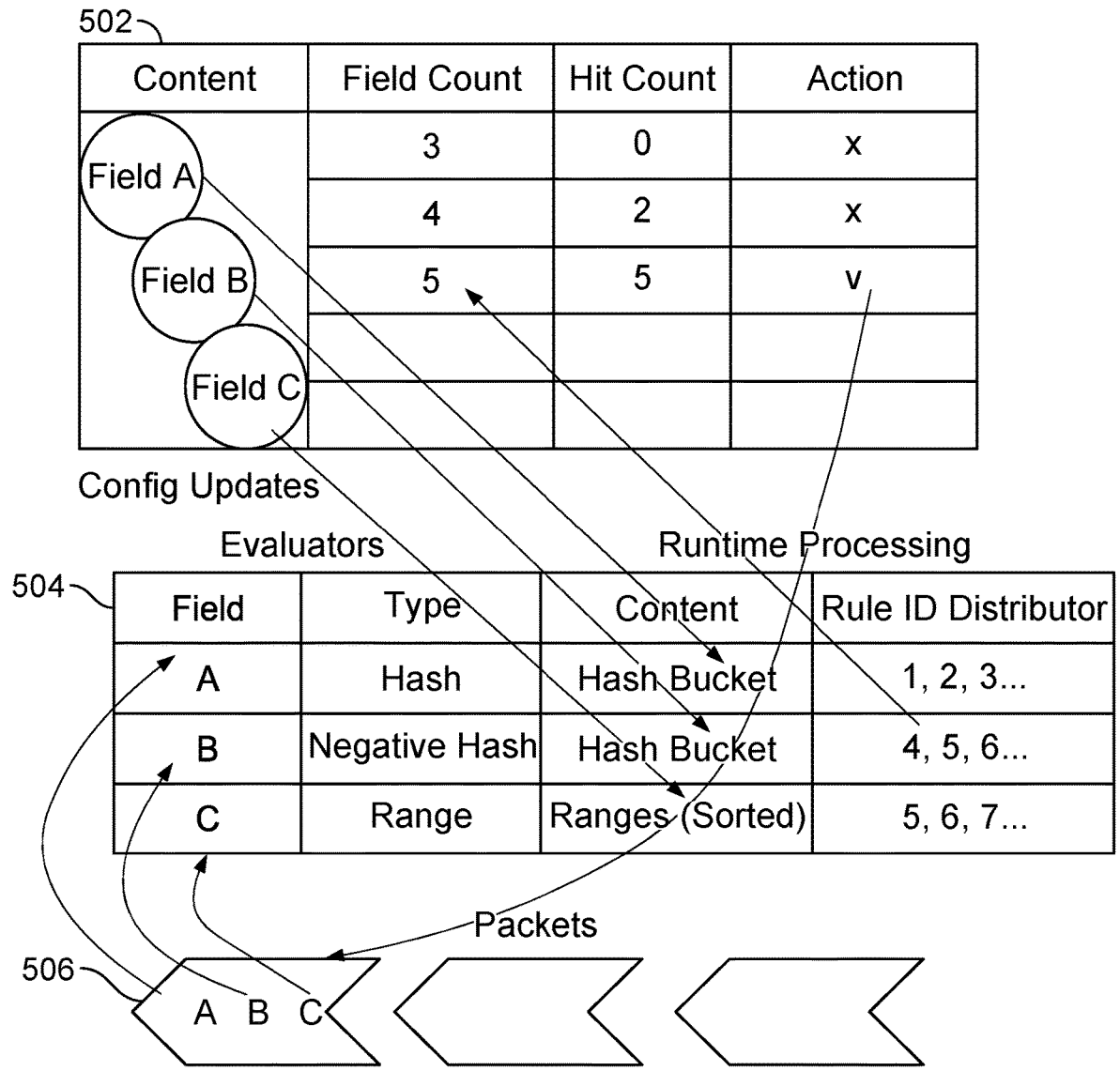
FIG. 5 illustrates a functional diagram of a threat engine that implements fast policy matching with runtime signature update in accordance with some embodiments.

FIG. 5 illustrates a functional diagram of a threat engine that implements fast policy matching with runtime signature update in accordance with some embodiments. As similarly discussed above, in various embodiments, data appliance 102 includes a malware analysis module 112 that includes a threat engine 244. In an example implementation, threat engine 244 is implemented as shown in the functional diagram illustrated in FIG. 5 for implementing fast policy matching with runtime signature update (e.g., for a firewall that can scan every packet in a fast path).

Referring to FIG. 5, the threat engine receives a signature update in the form of a content update (e.g., from a cloud security service, such as shown at 122 in FIG. 1) as shown at 502. The threat engine then parses the rules (e.g., user defined rules) to extract distinct fields. In this example implementation, the content parsing engine is format agnostic (e.g., the same content parsing engine can be reused to parse various network protocol formats of packets, such as IPv4, IPv6, TCP, UDP, SCTP, GTP, etc., without requiring code modifications). As such, it can be used to support a new format through a content update.

Evaluators 504 are generated for each of the extracted fields. Runtime processing of incoming network packets is performed using the evaluators as shown at 506.

Accordingly, the disclosed system embodiments facilitate fast policy matching with runtime signature update. As described above with respect to FIG. 5, the disclosed techniques can be performed in a security device, such as a firewall, that can scan every packet in a fast path. The packets can be matched against predefined filters as similarly described above (e.g., filters can include predefined signatures; signatures can include combinations of predefined field values; and signatures can be updated through content updates). Each filter can contain multiple field values to be matched as also discussed above. Various matching algorithms have been described above, including the following: a (negative) exact match, a (negative) exact match with mask, and a range match. Packets can also be grouped by identities (e.g., source or destination). A rate limit can also be applied to each individual group. The evaluation can be performed across sessions (e.g., network sessions).

As will be further described below, the disclosed system embodiments provide for various performance improvements.

Performance Improvements and Measurements Based on Experiments

Given that the number of fields that need to be supported for all formats is limited (e.g., IP has approximately 13 fields and TCP has approximately 10 fields), by aggregating the same field together, a significant number of redundant evaluations can be reduced during runtime. In other words, the total number of evaluators will not increase proportionally with the total number of configured filters. Also, by utilizing hash lookup and binary search, the performance is further enhanced as similarly discussed above.

As such, with the above-described example implementation, it is possible to achieve reasonable performance even when large volumes of incoming data have to be examined by thousands of user configured filters. Given that the total amount of Internet traffic keeps increasing significantly each year, and data complexity also continues to increase over time, the disclosed techniques can provide performance improvements to a variety of different applications in addition to the above-described application for processing/evaluation of security rules, such as malware signatures.

For example, the table provided below shows a worst case comparison of total CPU time, from 100 rules to 5000 rules based on an experiment. As expected, the time consumed by the disclosed techniques for fast policy matching with runtime signature update does not change linearly with the total number of rules as is the case for existing, traditional approaches.

| Number of Rules | CPU Time of New Algorithm | CPU Time of Traditional Algorithm | Ratio |
|---|---|---|---|
| 100 | 16.6 | 24.3 | .68 |
| 200 | 16.9 | 43.9 | .38 |
| 500 | 18.3 | 102.5 | .18 |
| 1000 | 19.5 | 207.4 | .094 |
| 2000 | 21.3 | 434.3 | .049 |
| 3000 | 20.6 | 670.4 | .031 |
| 5000 | 21.1 | 1046.2 | .020 |

Additional example processes for the disclosed techniques for fast policy matching with runtime signature update will now be described.

Example Processes for Fast Policy Matching With Runtime Signature Update

Figure 6:
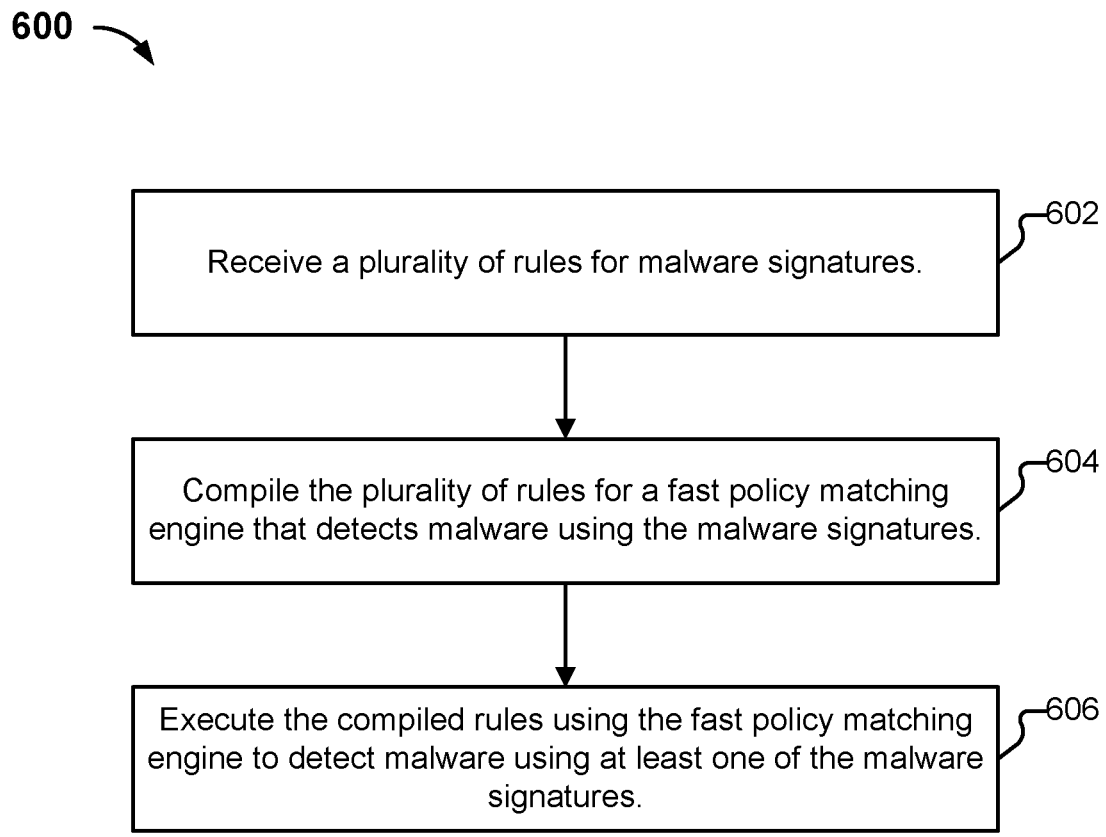
FIG. 6 is a flow diagram of an inline process for fast policy matching with runtime signature update in accordance with some embodiments.

FIG. 6 is a flow diagram of an inline process for fast policy matching with runtime signature update in accordance with some embodiments. In some embodiments, a process 600 as shown in FIG. 6 is performed by the security platform and techniques as similarly described above including the embodiments described above with respect to FIGS. 1-5. In one embodiment, process 600 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, a plurality of rules for malware signatures are received. For example, data appliance 102 and/or security platform 122 can receive a content update that includes a plurality of rules for malware signatures as similarly described above with respect to FIGS. 1-5.

At 604, the plurality of rules are compiled for a fast policy matching engine that detects malware using the malware signatures. For example, the plurality of rules can be compiled for a fast policy matching engine that detects malware using the malware signatures as similarly described above with respect to FIGS. 4A-5.

At 606, the compiled rules are executed using the fast policy matching engine to detect malware using at least one of the malware signatures. For example, the compiled rules can be executed using the fast policy matching engine to detect malware using at least one of the malware signatures as similarly described above with respect to FIGS. 4A-5.

Figure 7:
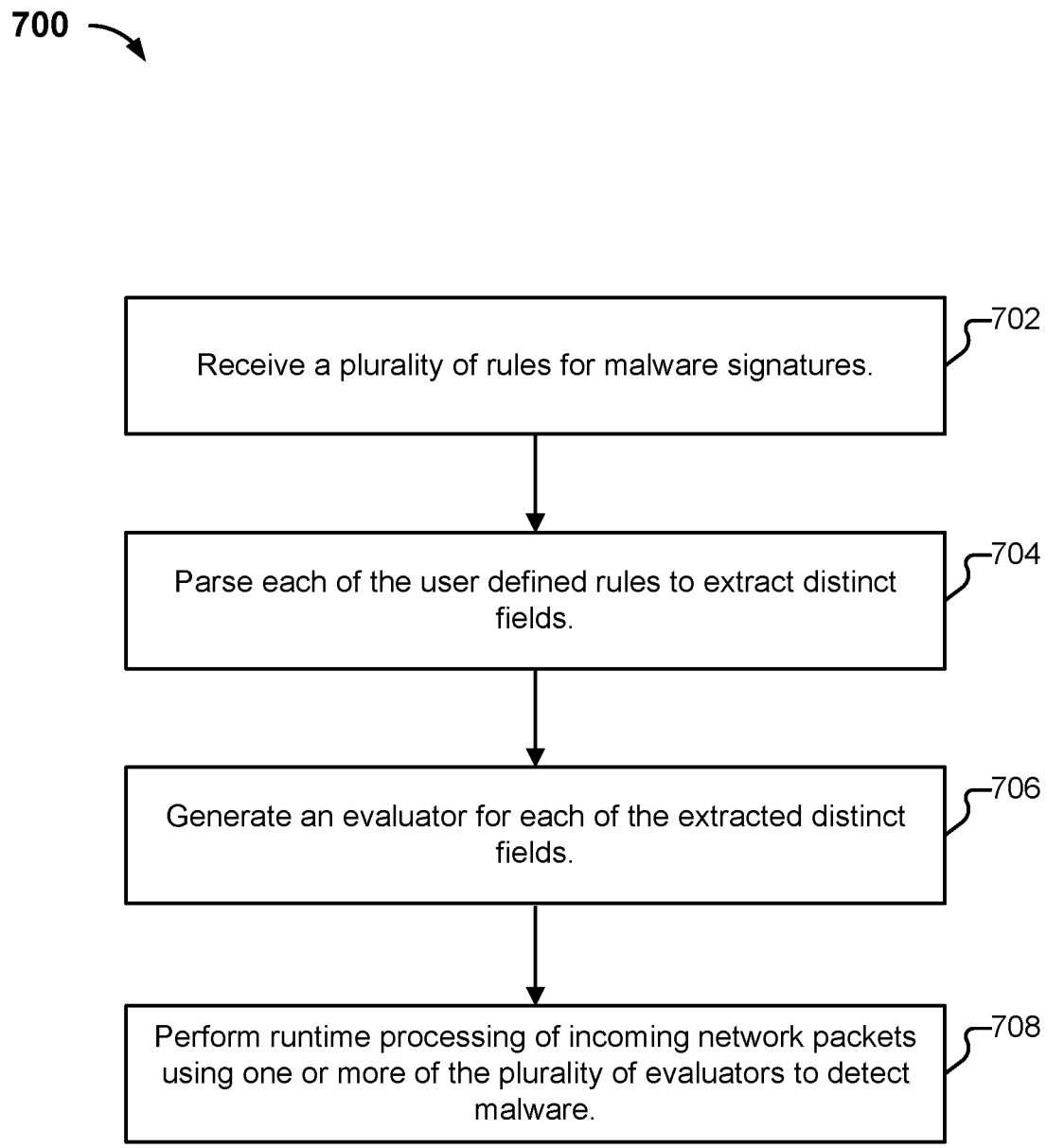
FIG. 7 is another flow diagram of an inline process for fast policy matching with runtime signature update in accordance with some embodiments.

FIG. 7 is another flow diagram of an inline process for fast policy matching with runtime signature update in accordance with some embodiments. In some embodiments, a process 700 as shown in FIG. 7 is performed by the security platform and techniques as similarly described above including the embodiments described above with respect to FIGS. 1-5. In one embodiment, process 700 is performed by data appliance 102 as described above with respect to FIG. 1, security platform 122 as described above with respect to FIG. 1 (e.g., as a cloud-based security service), a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, a plurality of rules for malware signatures are received. For example, data appliance 102 and/or security platform 122 can receive a content update that includes a plurality of rules for malware signatures as similarly described above with respect to FIGS. 1-5.

At 704, parsing each of the user defined rules to extract distinct fields is performed. For example, parsing each of the user defined rules to extract distinct fields can be performed as similarly described above with respect to FIGS. 4A-5.

At 706, generating an evaluator for each of the extracted distinct fields is performed. For example, generating an evaluator for each of the extracted distinct fields can be performed as similarly described above with respect to FIGS. 4A-5.

At 708, runtime processing of incoming network packets using one or more of the plurality of evaluators to detect malware is performed. For example, runtime processing of incoming network packets using one or more of the plurality of evaluators to detect malware can be performed as similarly described above with respect to FIGS. 4A-5. As an example, the data appliance (102) can then perform an action based on a policy (e.g., malware policy, which can be stored in policies 252 as shown in FIG. 2B) in response to the malware verdict.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a plurality of rules for malware signatures;
compile the plurality of rules for a fast policy matching engine that detects malware using the malware signatures; and
execute the compiled plurality of rules using the fast policy matching engine to detect malware using at least one of the malware signatures; and
a memory coupled to the processor and configured to provide the processor with instructions.

2. The system of claim 1, wherein the fast policy matching engine is for a layer 3 and layer 4 threat engine of a firewall.

3. The system of claim 1, wherein the fast policy matching engine is implemented in software.

4. The system of claim 1, wherein the fast policy matching engine is implemented in hardware.

5. The system of claim 1, wherein the fast policy matching engine includes a hash bucket evaluator for match, not match, and range.

6. The system of claim 1, wherein the processor is further configured to perform runtime processing of incoming network packets to detect malware.

7. The system of claim 1, wherein the malware signatures comprise a set of user defined rules, and wherein the processor is further configured to compile the rules by performing the following:
parse each of a plurality of user defined rules to extract distinct fields; and
generate an evaluator for each of the extracted distinct fields.

8. The system of claim 1, wherein the malware signatures comprise a set of user defined rules, and wherein the processor is further configured to compile the rules by performing the following:
parse each of a plurality of user defined rules to extract distinct fields;
generate a plurality of evaluators, wherein there is at least one evaluator for each of the extracted distinct fields; and
perform runtime processing of incoming network packets using one or more of the plurality of evaluators to detect malware.

9. A method, comprising:
receiving a plurality of rules for malware signatures;
compiling the plurality of rules for a fast policy matching engine that detects malware using the malware signatures; and
executing the compiled plurality of rules using the fast policy matching engine to detect malware using at least one of the malware signatures.

10. The method of claim 9, wherein the fast policy matching engine is for a layer 3 and layer 4 threat engine of a firewall.

11. The method of claim 9, wherein the fast policy matching engine is implemented in software.

12. The method of claim 9, wherein the fast policy matching engine is implemented in hardware.

13. The method of claim 9, wherein the fast policy matching engine includes a hash bucket evaluator for match, not match, and range.

14. The method of claim 9, further comprising performing runtime processing of incoming network packets to detect malware.

15. The method of claim 9, further comprising:
parsing each of a plurality of user defined rules to extract distinct fields; and
generating an evaluator for each of the extracted distinct fields.

16. The method of claim 9, further comprising:
parsing each of a plurality of user defined rules to extract distinct fields;
generating an evaluator for each of the extracted distinct fields; and
performing runtime processing of incoming network packets using the to detect malware.

17. A computer program product embodied in a non-transitory computer readable medium and comprising computer instructions for:
receiving a plurality of rules for malware signatures;
compiling the plurality of rules for a fast policy matching engine that detects malware using the malware signatures; and
executing the compiled plurality of rules using the fast policy matching engine to detect malware using at least one of the malware signatures.

18. The computer program product of claim 17, wherein the fast policy matching engine is for a layer 3 and layer 4 threat engine of a firewall.

19. The computer program product of claim 17, wherein the fast policy matching engine includes a hash bucket evaluator for match, not match, and range.

20. The computer program product of claim 17, further comprising computer instructions performing runtime processing of incoming network packets to detect malware.

* * * * *